Feb. 21, 1956          L. LAUBENDER        2,735,736
APPARATUS FOR SEALING THE SPACE BETWEEN A PISTON
AND FLOATING WRIST PIN THEREOF AND PROCESS
FOR ASSEMBLING THE SAME
Filed Feb. 26, 1953
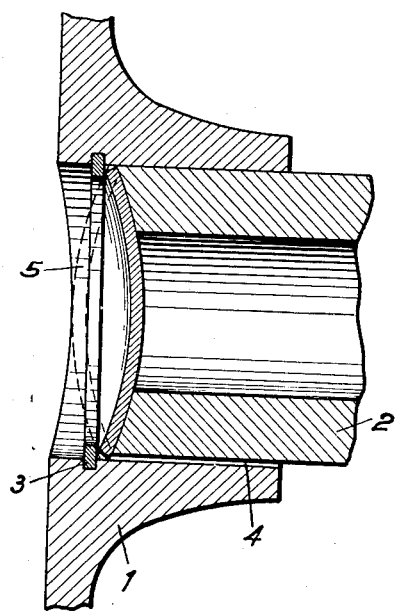
INVENTOR:
LUDWIG LAUBENDER
BY:

United States Patent Office 2,735,736
Patented Feb. 21, 1956

2,735,736

APPARATUS FOR SEALING THE SPACE BETWEEN A PISTON AND FLOATING WRIST PIN THEREOF AND PROCESS FOR ASSEMBLING THE SAME

Ludwig Laubender, Traunstein, Upper Bavaria, Germany, assignor to Krauss-Maffei Aktiengesellschaft, Munich-Allach, Germany Application February 26, 1953, Serial No. 338,983

Claims priority, application Germany October 14, 1952

5 Claims. (Cl. 309—19)

The present invention relates to internal combustion engines.

More particularly, the present invention relates to pistons of internal combustion engines and apparatus for preventing oil from flowing through the space between the piston and wrist pin thereof.

It is well known that in two stroke internal combustion engines the wrist pin of the piston is constantly pressed against the top part of the piston bore in which it is located so that there is always a clearance at the lower part of this bore through which oil may flow to the exterior of the piston between the outer wall thereof and the cylinder wall. This is particularly undesirable especially in two stroke engines because this oil reaches the exhaust ports at the side of the cylinder wall and causes the same to become plugged up to a certain extent with carbon deposits created by the oil and to function at less than the best possible efficiency. This problem has been recognized before, but so far all the solutions to the problem have required special piston and wrist pin structures which are quite elaborate and expensive.

One of the objects of the present invention is to overcome the above difficulties by providing an exceedingly simple structure to prevent oil from flowing along the wrist pin to the exterior of the piston between the outer wall thereof and the cylinder wall.

A further object of the present invention is to provide an apparatus of this type which may be used with conventional pistons and wrist pins.

Another object of the present invention is to provide an apparatus of this type which is very easy to assembly and place in its final operating position.

With the above objects in view, the present invention mainly consists of an apparatus for sealing the space between a piston and floating wrist pin thereof, this apparatus including a piston formed with an opening passing therethrough and a wrist pin freely mounted in this opening. A circular plate is located next to an end of the wrist pin in this opening of the piston and has its outer periphery pressed against the piston so that oil cannot flow in the opening beyond the wrist pin and plate located next to the same.

Also with the above objects in view, the present invention mainly consists of a process for mounting in the bore of a piston a dished springy plate having in its unstressed condition an outer diameter which is slightly smaller than the diameter of the piston bore, this process including the steps of moving the plate to a predetermined part of the piston bore in a position extending across the same, snapping the center of the plate toward the opposite side of the periphery thereof so that the outer diameter of the plate increases to cause the periphery thereof to press against the piston at the bore thereof and to cause the originally concave and convex faces of the plate to respectively become convex and concave, and preventing the plate from moving fully through to its opposite unstressed position so that the periphery of the plate remains in engagement with the piston in the bore thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Referring now to the drawing, a piston 1 is fragmentarily illustrated therein, this piston 1 being formed with a pair of aligned opposite openings in which the end portions of the wrist pin 2 are located, only one of these openings and only one end portion of the wrist pin 2 being shown in the drawing. The opposite side of the piston and wrist pin are identical with that shown in the drawing. As is shown in the drawing the piston 1 is provided with a groove in which a snap ring 3 is located so as to restrain the wrist pin 2 against axial movement, a similar snap ring 3 being located at the opposite unillustrated side of the piston.

The wrist pin 2 is of the type known as a floating wrist pin in that it is freely mounted in the openings of the piston. It is well known that in two stroke engines the wrist pin 2 is constantly pressed against the top part of the piston openings so as to provide a constant clearance 4 through which oil, oil vapors, and the like flow to the exterior of the piston between the same and the cylinder wall to cause undesirable deposits at the exhaust ports, as was mentioned above.

In order to prevent this undesirable phenomenon, a dished circular plate 5 of a springy metal is provided at each end of the wrist pin 2, and the latter is provided with concave end faces one of which is shown in the drawing. The circular plate 5 is shown in dotted lines in its original unstressed condition upon being placed in the piston bore in a position extending across the same. The snap ring 3 is mounted on the piston after the plate 5 is located therein. This plate 5 has, in its unstressed condition, an outer diameter which is slightly smaller than that of the piston opening so that the plate 5 is very easily moved to the dotted line position shown in the drawing.

Then the center of the plate 5 is given a sharp blow to snap this center toward the opposite side of the periphery of plate 5 which engages the end of wrist pin 2 so that the plate 5 assumes the solid line position shown in the drawing where the originally concave and convex faces of plate 5 are now respectively convex and concave. The curvature of the convex outer face of plate 5 is sharper than that of the concave end face of the wrist pin 2 so that this end face of the wrist pin 2 engages the convex face of plate 5 and prevents the latter from moving fully through to the unstressed condition of the plate 5.

During movement of the plate 5 from the dotted to the solid line positions shown in the drawing, the periphery of the plate 5 expands to tightly press against the piston in the opening thereof, and since the concave end face of wrist pin 2 prevents the plate 5 from moving through to its fully unstressed position, the periphery of plate 5 remains expanded and in engagement with the piston to seal off the clearance 4 from the exterior of the piston.

Thus, through the simple expedient of providing the wrist pin with concave end faces and providing a pair of plates 5, any conventional piston and wrist pin may be provided with the structure of the invention. Also, it is evident that the assembly of the plate 5 together with the wrist pin and piston is extremely simple and requires but a few moments and absolutely no skilled labor.

It will be understood that each of the elements described above, or two or more together, may also find a useful application in other types of apparatus and process for preventing oil from flowing through a piston opening differing from the types described above.

While the invention has been illustrated and described as embodied in apparatus and process for preventing oil from flowing along a floating wrist pin through a piston opening, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for sealing the space between a piston and floating wrist pin thereof, comprising, in combination, a piston formed with an opening passing therethrough; a wrist pin freely mounted in said opening; and a circular dished plate located next to an end of said wrist pin in said opening of said piston and having its outer periphery pressed against said piston so that oil cannot flow in said opening beyond said wrist pin and plate located next to the same, said plate consisting of a springy material and engaging said end of said wrist pin in a position between the flat position of said plate and the unstressed position of said plate so that said wrist pin end prevents said plate from moving to said unstressed position thereof.

2. Apparatus for sealing the space between a piston and floating wrist pin thereof, comprising, in combination, a piston formed with an opening passing therethrough; a wrist pin freely mounted in said opening and having a concave end face of predetermined curvature; and a circular plate located next to said end face of said wrist pin in said opening of said piston and having its outer periphery pressed against said piston so that oil cannot flow in said opening beyond said wrist pin and plate located next to the same, said plate being dished and having in its unstressed condition an outer diameter smaller than that of said opening and said plate having a convex face engaging said end face of said wrist pin and being of a sharper curvature than the same so that said end face of said wrist pin prevents said plate from assuming its unstressed position.

3. Apparatus for sealing the space between a piston and floating wrist pin thereof, comprising, in combination, a piston formed with an opening passing therethrough; a wrist pin freely mounted in said opening and having a concave end face of predetermined curvature; a circular plate located next to said end face of said wrist pin in said opening of said piston and having its outer periphery pressed against said piston so that oil cannot flow in said opening beyond said wrist pin and plate located next to the same, said plate being dished and having in its unstressed condition an outer diameter smaller than that of said opening and said plate having a convex face engaging said end face of said wrist pin and being of a sharper curvature than the same so that said end face of said wrist pin prevents said plate from assuming its unstressed position; and a snap ring located in said opening of said piston on the side of said plate opposite from said wrist pin.

4. In an internal combustion engine, in combination, a piston formed with an opening passing therethrough; a wrist pin freely mounted in said opening; and a circular dished plate of a springy material having in its unstressed condition a diameter smaller than that of said opening and in its flattened condition a diameter larger than that of said opening, said plate being located in said opening with a convex face of said plate engaging an end of said wrist pin and with the outer periphery of said plate pressing against said piston in said opening thereof, said end of said wrist pin maintaining said plate in an intermediate condition between said unstressed and flattened conditions thereof where the outer diameter of said plate is still larger than the diameter of said opening.

5. In an internal combustion engine, in combination, a circular dished plate of a springy metal having in its unstressed condition a minimum diameter and in its flattened condition a maximum diameter, and said plate having between said unstressed and flattened conditions thereof an intermediate condition where the diameter of said plate is larger than said minimum diameter thereof and smaller than said maximum diameter thereof and where the convex face of said plate has a curvature less sharp than the curvature of said convex face in the unstressed condition of said plate; a piston formed with an opening passing therethrough of a diameter larger than said minimum diameter of said plate and smaller than the diameter of said plate in said intermediate condition thereof and said plate being located in said intermediate condition thereof in said opening so that the outer periphery of said plate presses against said piston in said opening thereof; and a wrist pin freely located in said opening and having an end face engaging said convex face of said plate, said end face of said wrist pin being concave and having a curvature corresponding to that of said convex face of said plate in said intermediate condition thereof so that said end face of said wrist pin has substantially its entire area in engagement with said convex face of said plate.

References Cited in the file of this patent

UNITED STATES PATENTS

| 1,285,755 | McCuen | Nov. 26, 1918 |
| 1,415,422 | Allen | May 9, 1922 |
| 1,637,247 | Snyder | July 26, 1927 |
| 2,415,232 | Brock | Feb. 4, 1947 |
| 2,573,424 | Flamm | Oct. 30, 1951 |

FOREIGN PATENTS

| 1,813 | Great Britain | 1915 |
| 710,596 | Germany | Sept. 17, 1941 |